Patented Apr. 26, 1938

2,115,157

UNITED STATES PATENT OFFICE 2,115,157

STARCH PRODUCT AND METHOD OF MAKING SAME

August J. Bulfer, Argo, and Anthony C. Horesi, Downers Grove, Ill., assignors to International Patents Development Company, Wilmington, Del., a corporation of Delaware No Drawing. Application October 18, 1935, Serial No. 45,546

16 Claims. (Cl. 127—29)

This invention relates to starch products suitable for use in brewing; and a principal object of the invention is to provide a quick malting corn starch product which, when put into the malting tubs without pre-pasting or cooking, will be completely, or substantially completely, converted by the action of the malt diastase, rapidly, and at the relatively low temperatures usually employed in malting operations.

A further object of the invention is the production of a material having the capacity for quick and complete conversion without pre-pasting which will be in such physical form that it will be and remain free flowing and substantially dustless. The product according to the invention may be in a granular or in a pulverulent state; but in either case, to be acceptable to the brewer it must be substantially free of very fine dust-like particles small enough to remain suspended in the air, as dust, when the material, for instance, is dumped into the malting tubs. If a brewing material contains any substantial quantity of dust, it will not be free flowing and its use will result in fouling the brewery and producing undesirable fermentations.

In producing the product contemplated by this invention corn starch is dextrinized, preferably at about 200° F., and not in excess of 220° F., to the extent that at least 15% is soluble in cold water. The dextrinization takes place in the usual manner. That is dry corn starch is roasted either in the presence of small amounts of hydrolyzing acids, or without acid, with constant agitation until the required degree of solubility is obtained. It has been found that for the purposes of this invention the solubility of the dextrinized starch need not be substantially greater than 15%. If dextrinized to a higher solubility, the rapidity with which the product is converted in the malting tubs is not substantially increased. However, no harm results from a higher degree of dextrinization than that mentioned.

The dextrinized starch is then treated to make it dustless. The ultimate product may be either in the form of a somewhat coarse powder or of granules or flakes. If the powdered form is desired, the dextrinized starch is sprayed with glucose (using the term in the commercial sense of partially converted starch syrup) or other starch conversion product in liquid form. The material is then ground in a mill to disintegrate the lumps. The blending of the dextrinized starch with glucose, or its equivalent, makes it substantially dustless in the sense of containing substantially no particles fine and light enough to float in the air when the material is poured or dumped from a package.

If the granular or flaked product is desired, the blended mixture of dextrinized starch and glucose is passed between heated rolls and the resulting sheets or flakes comminuted to the desired degree of fineness. Or the dextrinized starch may be moistened with water and passed between heated rolls.

The following specific examples are given to illustrate the process with the understanding that they are to be regarded as illustrative and not as limiting the invention to the particular data given.

*Example 1.*—2000 pounds of air dry corn starch is introduced with 10 pounds of commercial hydrochloric acid (28% HCl) into an ordinary dextrine cooker and cooked or roasted for 3 hours at a temperature of 200° F., the material being kept stirred, with mechanical agitators, in the manner usual for the manufacture of dextrines. The resultant product will have, as always in dextrinizing processes of this type, a very low moisture content and a solubility of 20% when tested by the usual tests for determining the solubilities of dextrines. The dextrinized starch is then sprayed with 15% of its own weight of commercial glucose of 40° to 45° Baumé which is atomized and intimately mixed with the dextrinized starch either in a mixing vessel or in a mixing conveyor, of the screw type for example, by which the material is transported to the next step of the process. This next step is the grinding of the blended dextrinized starch and glucose product in order to break up the lumps and reduce the material to powdered form. The amount of glucose used may vary from 5% to 40% by weight of the dextrinized starch. Instead of using glucose it is possible to employ other starch conversion products. By "starch conversion products" is intended any of the syrupy products resulting from the hydrolysis of starch to the stage in which dextrose in greater or less amount is produced. By "dextrinized starch" is intended starch treated by the usual dry roasting dextrinizing process whether the starch be partially or completely converted into dextrine.

*Example 2.*—The dextrinized starch after being sprayed with glucose, or its equivalent, as described in Example 1, is passed between hollow steam heated rolls having a superficial temperature of 250° to 300° F. which are set so that the resultant sheet of material has a thickness of one-eighth of an inch to one-quarter of an inch. The moisture content of the product entering the bight of the rolls should be between 12% and 18%. The material from the rolls is ground so that it is in the form of small flake-like granules.

*Example 3.*—The dextrinized starch, produced as described in Example 1, is moistened with water instead of with glucose, so as to have a moisture content of 14%, and is then passed between heated rolls under the conditions specified in Example 2, and the material from the rolls ground to the desired degree of fineness.

The treatment between the heated rolls in Examples 2 and 3 is primarily for the purpose of agglomerating the particles into flaky sheets for subsequent granulation. The conditions are such that the chemical character of the product is not affected, at least to any substantial extent.

If the dextrinization of the starch is carried far enough to make the product 15% soluble in water at the usual tap water temperature, the final product, whether in the form of powder or flakes or granules will have the capacity for rapid malting. That is, when 40 parts, by weight, of the starch product without prepasting are mixed with 60 parts of ground malt and 400 parts of water at a temperature of 158° F., the starch will be completely converted into sugar, or substantially so, within twenty minutes. This is what is meant by the term "quick malting".

It is the intention to cover all modifications of product and process within the scope of the appended claims.

We claim:

1. A dry, pulverulent, substantially dustless quick malting product consisting of dry roasted starch dextrinized to at least 15% solubility and starch syrup blended therewith.

2. A dry, substantially dustless, granular quick malting product in the form of flake-like granules consisting of dry roasted dextrinized starch of at least 15% solubility and starch syrup blended therewith.

3. A dry, substantially dustless quick malting product consisting of starch dextrinized by dry roasting to at least 15% solubility blended with starch syrup.

4. A dry, substantially dustless quick malting product consisting of dry roasted dextrinized starch of at least 15% solubility blended with glucose.

5. A dry material capable of being substantially completely converted by malt diastase and consisting of starch dextrinized by dry roasting to at least 15% solubility blended with a starch conversion product.

6. A dry material consisting of a mixture of starch dextrinized by dry roasting to at least 15% solubility blended with from 5% to 40% by weight of glucose.

7. Dry roasted, dextrinized starch of at least 15% solubility capable of being substantially completely converted by malt diastase and in a substantially dry, dustless state.

8. Dry roasted, dextrinized starch of at least 15% solubility in the form of flake-like granules and substantially free from dust.

9. Process of making a quick malting starch product suitable for brewing which comprises dextrinizing starch to at least 15% solubility by dry roasting and intimately mixing therewith a finely divided liquid starch conversion product.

10. Process of making a quick malting starch product suitable for brewing which comprises dextrinizing starch by dry roasting to a solubility of at least 15% and spraying the same with 5% to 40%, by weight, of atomized glucose.

11. Process of making a quick malting starch product suitable for brewing which comprises dextrinizing starch by dry roasting to at least 15% solubility, intimately mixing therewith a liquid starch conversion product in a finely divided state and then passing the mixture between heated rolls.

12. Process of making a quick malting starch product suitable for brewing which comprises dextrinizing starch by dry roasting to at least 15% solubility, intimately mixing therewith a liquid starch conversion product in a finely divided state, then passing the mixture with 12% to 18% moisture between heated rolls and comminuting the material to form flake-like granules.

13. Process of making a quick malting starch product suitable for brewing which comprises dextrinizing starch by dry roasting to at least 15% solubility, intimately mixing therewith a liquid starch conversion product in a finely divided state, then passing the mixture with 12% to 18% moisture between rolls heated to a peripheral temperature of 250° to 300° Fahrenheit and comminuting the material to form flake-like granules.

14. A substantially dustless product in the form of flake-like granules consisting of dry roasted dextrine having a solubility greater than 15% and capable of being substantially completely converted by malt diastase.

15. Process of making a starch product suitable for brewing which comprises dextrinizing starch by dry roasting at a temperature not substantially in excess of 220° F. to give the product a solubility in excess of 15% and make it capable of being substantially completely converted by malt diastase; moistening the dextrine; passing the moistened dextrine between heated rolls; and comminuting the material from the rolls to form substantially dustless flake-like granules.

16. Process of making a starch product suitable for brewing which comprises dextrinizing starch by dry roasting at a temperature not substantially in excess of 220° F. to give the product a solubility of 15% and make it capable of being substantially completely converted by malt diastase; moistening the dextrine with water to give it a moisture content of about 14%; passing the moistened dextrine between heated rolls; and comminuting the material from the rolls to form substantially dustless flake-like granules.

AUGUST J. BULFER.
ANTHONY C. HORESI.